United States Patent
Kasamai et al.

(10) Patent No.: US 10,082,818 B2
(45) Date of Patent: Sep. 25, 2018

(54) ELECTRONIC CIRCUIT, PROTECTIVE DEVICE, AND IMAGE FORMING APPARATUS

(71) Applicants: Masashi Kasamai, Kanagawa (JP); Kohhei Yamaguchi, Kanagawa (JP); Yoshihiro Takahashi, Tokyo (JP)

(72) Inventors: Masashi Kasamai, Kanagawa (JP); Kohhei Yamaguchi, Kanagawa (JP); Yoshihiro Takahashi, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 20 days.

(21) Appl. No.: 15/358,551

(22) Filed: Nov. 22, 2016

(65) Prior Publication Data

US 2017/0153658 A1    Jun. 1, 2017

(30) Foreign Application Priority Data

Nov. 27, 2015  (JP) .................. 2015-231887
Oct. 18, 2016  (JP) .................. 2016-204612

(51) Int. Cl.

| H02H 7/20 | (2006.01) |
|---|---|
| G05F 3/26 | (2006.01) |
| H02P 31/00 | (2006.01) |
| H02P 29/024 | (2016.01) |
| G03G 15/00 | (2006.01) |
| H02H 9/04 | (2006.01) |
| H02P 29/032 | (2016.01) |

(52) U.S. Cl.
CPC ............ *G05F 3/267* (2013.01); *G03G 15/80* (2013.01); *H02H 9/041* (2013.01); *H02P 29/0241* (2016.02); *H02P 29/032* (2016.02); *H02P 31/00* (2013.01); *G03G 2221/166* (2013.01); *G03G 2221/1684* (2013.01)

(58) Field of Classification Search
CPC ...... G05F 3/267; H02P 29/0241; H02P 31/00; G03G 15/80
See application file for complete search history.

(56) References Cited

U.S. PATENT DOCUMENTS

2008/0164854 A1*  7/2008  Lys .................. H05B 33/0815
                                                           323/226

FOREIGN PATENT DOCUMENTS

| JP | 2000-201429 | 7/2000 |
|---|---|---|
| JP | 2008-104328 | 5/2008 |
| JP | 2009-177865 | 8/2009 |

* cited by examiner

*Primary Examiner* — David M Gray
*Assistant Examiner* — Michael Harrison
(74) *Attorney, Agent, or Firm* — Harness, Dickey & Pierce, P.L.C.

(57) ABSTRACT

An electronic circuit includes a first consumption part, at least one second consumption part, and a current mirror circuit. The first consumption part passes a current to consume electricity when a voltage exceeding a first voltage is applied. At least one second consumption part is disposed in parallel with the first consumption part and passes a current to consume electricity. The current mirror circuit passes, to the second consumption part, a current corresponding to a current that flows through the first consumption part.

14 Claims, 10 Drawing Sheets

ELECTRONIC CIRCUIT, PROTECTIVE DEVICE, AND IMAGE FORMING APPARATUS

CROSS-REFERENCE TO RELATED APPLICATIONS

The present application claims priority under 35 U.S.C. § 119 to Japanese Patent Application No. 2015-231887, filed on Nov. 27, 2015 and Japanese Patent Application No. 2016-204612, filed on Oct. 18, 2016. The contents of which are incorporated herein by reference in their entirety.

BACKGROUND OF THE INVENTION

1. Field of the Invention

The present invention relates to an electronic circuit, a protective device, and an image forming apparatus.

2. Description of the Related Art

A circuit including a Zener diode is known as a protective circuit against overvoltages.

Japanese Unexamined Patent Application Publication No. 2009-177865 discloses a protective circuit that includes a Zener diode and a field effect transistor (FET). In the protective circuit disclosed in Japanese Unexamined Patent Application Publication No. 2009-177865, current flows also through the FET when the Zener diode breaks down.

When a device to be protected outputs a large current, the protective circuit needs to include a Zener diode having a large allowable dissipation. Zener diodes having a large allowable dissipation, however, cost high.

Even in a configuration including a plurality of Zener diodes connected in parallel with each other, only one of the Zener diodes breaks down due to variations involved in a breakdown voltage (Zener voltage). Thus, the connection of Zener diodes in parallel with each other does not increase the allowable dissipation, disabling the protective circuit to pass a large current.

SUMMARY OF THE INVENTION

According to one aspect of the present invention, an electronic circuit includes a first consumption part, at least one second consumption part, and a current mirror circuit. The first consumption part passes a current to consume electricity when a voltage exceeding a first voltage is applied. At least one second consumption part is disposed in parallel with the first consumption part and passes a current to consume electricity. The current mirror circuit passes, to the second consumption part, a current corresponding to a current that flows through the first consumption part.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an electronic circuit that can pass a current to consume electricity with a simple configuration.

Figure 1:
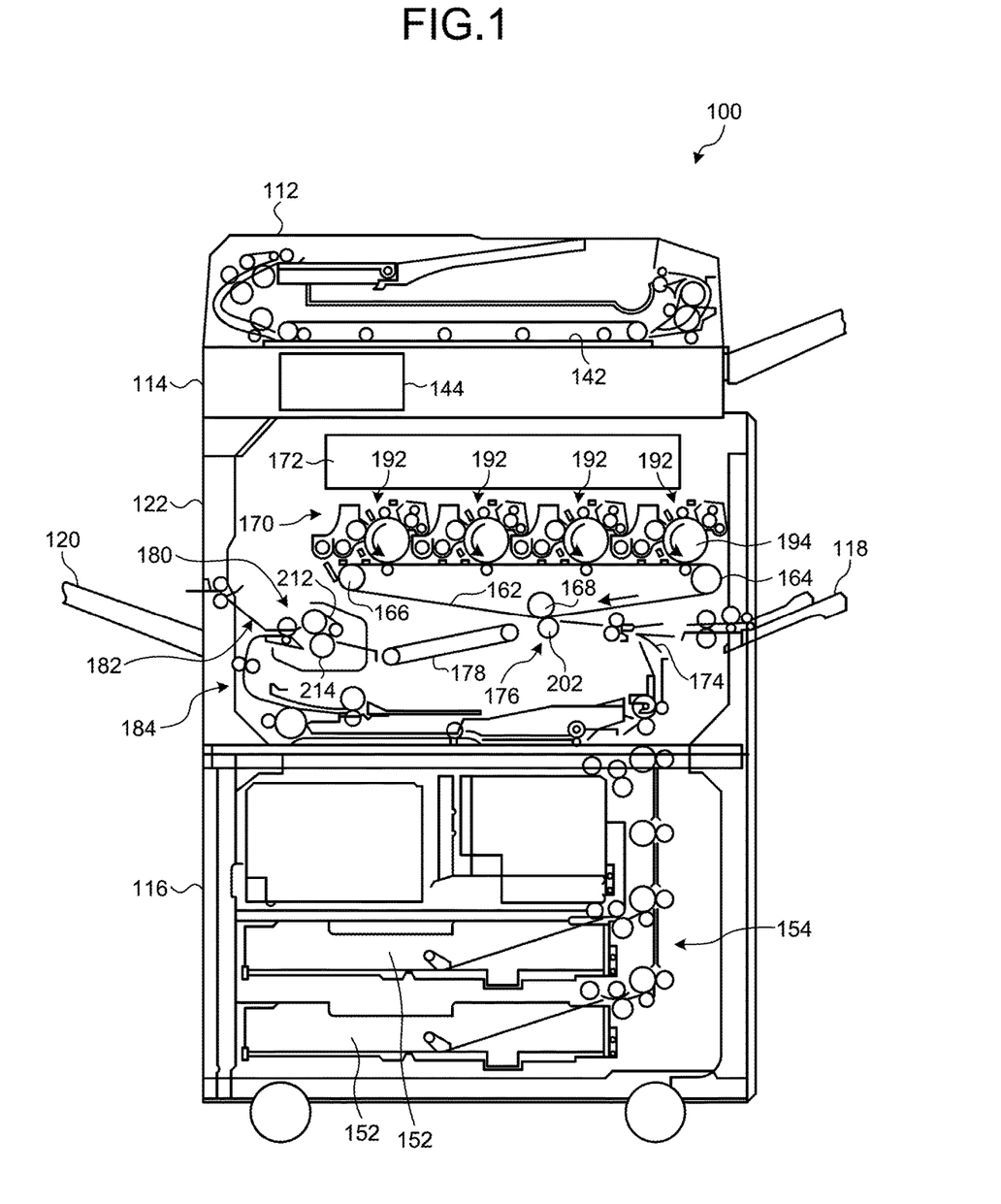
FIG. 1 is a diagram illustrating a configuration of an image forming apparatus according to an embodiment.

FIG. 1 is a diagram illustrating a configuration of an image forming apparatus 100 according to the embodiment. The image forming apparatus 100 forms an image on paper (a recording medium). The image forming apparatus 100 includes an automatic document conveyance unit 112, an image reading unit 114, a cassette paper feeding unit 116, a manual paper feeding unit 118, a paper ejection tray 120, and an apparatus main unit 122.

The automatic document conveyance unit 112 is disposed on the image reading unit 114. The automatic document conveyance unit 112 takes up one document sheet at a time from a document bundle placed on a document tray and feeds the document sheet to the image reading unit 114.

The image reading unit 114 is disposed on the apparatus main unit 122. The image reading unit 114 includes a contact glass 142 and a scanning optical unit 144. The contact glass 142 constitutes an upper surface portion of a housing. The contact glass 142 provides a surface on which a document sheet is placed by the automatic document conveyance unit 112 or manually by a user. The scanning optical unit 144 scans an image on a surface of the document placed on the contact glass 142 and generates image data.

The cassette paper feeding unit 116 is disposed beneath the apparatus main unit 122. The cassette paper feeding unit 116 includes at least one cassette 152 and a paper feeding mechanism 154. The cassette 152 stores paper on which an image is yet to be formed. The paper feeding mechanism 154 conveys paper stored in the cassette 152 onto the apparatus main unit 122.

The manual paper feeding unit 118 is disposed on a lateral surface of the apparatus main unit 122. The manual paper feeding unit 118 is mounted so as to be opened or closed with respect to the apparatus main unit 122. Under a condition in which the manual paper feeding unit 118 is opened with respect to the apparatus main unit 122, paper on which an image is yet to be formed is placed by the user on the manual paper feeding unit 118. The manual paper feeding unit 118 conveys the paper placed thereon by the user onto the apparatus main unit 122.

The paper ejection tray 120 is disposed on a lateral surface of the apparatus main unit 122. The paper ejection tray 120 receives paper on which an image has been formed and that has been ejected from the apparatus main unit 122.

The apparatus main unit 122 receives paper from the cassette paper feeding unit 116 or the manual paper feeding unit 118. The apparatus main unit 122 forms on the received paper an image that corresponds to the image data scanned by the image reading unit 114. The apparatus main unit 122 ejects the paper on which the image has been formed into the paper ejection tray 120.

The apparatus main unit 122 includes an intermediate transfer belt 162, a first roller 164, a second roller 166, a third roller 168, a tandem image forming unit 170, an exposure unit 172, a main conveyance path 174, a secondary transfer unit 176, an intermediate conveyance path 178, a fixing unit 180, a paper ejection path 182, and a reversal conveyance path 184.

The intermediate transfer belt 162 is wound around the first roller 164, the second roller 166, and the third roller 168. The first roller 164 is driven by, for example, a motor to thereby cause the intermediate transfer belt 162 to travel in a predetermined direction (in the direction indicated by an arrow in FIG. 1). The second roller 166 and the third roller 168 are rotated as the intermediate transfer belt 162 travels.

The tandem image forming unit 170 includes four photoconductor units 192. The four photoconductor units 192 are associated with four colors of yellow (Y), cyan (C), magenta (M), and black (K), respectively. Each of the photoconductor units 192 includes, for example, a drum-shaped photoconductor drum 194, a charging unit, a developing device, a photoconductor cleaning unit, and a charge neutralizing unit.

The exposure unit 172 exposes the photoconductor drum 194 included in the photoconductor unit 192 that is associated with a specific color according to color data that corresponds to the image data scanned by the image reading unit 114. Each photoconductor drum 194 is exposed by the exposure unit 172, so that a toner image is formed on a lateral surface of the photoconductor drum 194.

The photoconductor drums 194 are disposed along a traveling direction of the intermediate transfer belt 162. The intermediate transfer belt 162 travels, while being brought into contact with lateral surfaces of the respective photoconductor drums 194. As a result, the toner images formed on the respective photoconductor drums 194 are transferred onto a first surface of the intermediate transfer belt 162 as the intermediate transfer belt 162 travels.

Each photoconductor drum 194 is adjusted for exposure timing of the toner images such that the toner image of each color based on identical image data is transferred to an identical position on the intermediate transfer belt 162. Thus, the toner image of each color based on the identical image data is transferred to the identical position on the intermediate transfer belt 162. As a result, after the intermediate transfer belt 162 has traveled past the four photoconductor drums 194, a full-color toner image corresponding to the image data is formed on the intermediate transfer belt 162.

The main conveyance path 174 receives paper fed from the cassette paper feeding unit 116. The main conveyance path 174 also receives paper fed from the manual paper feeding unit 118. The main conveyance path 174 feeds the received paper to the secondary transfer unit 176 at predetermined timing.

The secondary transfer unit 176 includes a secondary transfer roller 202. The secondary transfer roller 202 is disposed with a lateral surface thereof abutting against the third roller 168 across the intermediate transfer belt 162. The secondary transfer roller 202 rotates in a direction opposite to a direction in which the third roller 168 rotates. The foregoing arrangement enables the third roller 168 and the secondary transfer roller 202 with the intermediate transfer belt 162 interposed therebetween in a gap region (nip) in which the third roller 168 and the secondary transfer roller 202 are in abutment with each other.

The paper received by the main conveyance path 174 is fed onto the nip formed between the third roller 168 and the secondary transfer roller 202. The paper has a leading end side advancing into the nip. The third roller 168 and the secondary transfer roller 202 rotate with the intermediate transfer belt 162 and the paper interposed in the nip. This action causes the paper to pass through the nip while being brought into contact with the intermediate transfer belt 162.

The toner image has already been stuck to a surface of the intermediate transfer belt 162 to be in contact with the paper before the paper enters the nip. The paper has a leading end advancing into the nip in synchronism with timing at which the toner image stuck to the intermediate transfer belt 162 enters the nip. Consequently, the toner image stuck to the intermediate transfer belt 162 moves past the nip, while being brought into contact with a surface of the paper. The third roller 168 and the secondary transfer roller 202 apply predetermined pressure to the paper and the toner image as the paper and the toner image pass through the nip. The application of the pressure causes the toner image on the surface of the intermediate transfer belt 162 to be transferred onto the paper.

The paper to which the toner image has been transferred and that has been discharged from the secondary transfer unit 176 is fed onto the intermediate conveyance path 178. The intermediate conveyance path 178 conveys the paper to which the toner image has been transferred and that has been discharged from the secondary transfer unit 176 onto the fixing unit 180.

The fixing unit 180 includes a fixing belt 212 that is an endless belt and a pressure roller 214. The pressure roller 214 is pressed against the fixing belt 212. The pressure roller 214 rotates the paper, to which the toner image has been transferred, interposed between the roller itself and the fixing belt 212 under predetermined pressure. The pressure roller 214 also applies heat to the interposed paper. The fixing unit 180, having a configuration as described above, applies heat and pressure to the paper thereby to melt toner of the toner image that has been transferred to the paper and to fix a color image in the paper.

The paper in which the color image has been fixed by the fixing unit 180 is fed onto the paper ejection path 182. The paper ejection path 182 places the paper discharged from the fixing unit 180 onto the paper ejection tray 120.

When a second color image is to be fixed in a back surface of the paper in which a first color image has been fixed, the paper in which the first color image has been fixed by the fixing unit 180 is fed onto the reversal conveyance path 184. The reversal conveyance path 184 turns over the paper discharged from the fixing unit 180 and feeds the paper back again onto the main conveyance path 174.

The apparatus main unit 122, having arrangements as described above, includes a plurality of motors for driving paper, belts, rollers, and drums, for example. For example, the main conveyance path 174, the intermediate conveyance path 178, and the reversal conveyance path 184 include motors for conveying paper. The apparatus main unit 122 further includes sensors for detecting a paper jam occurring midway along a conveyance path.

It should be noted that the image forming apparatus 100 is not limited only to a tandem color copier and may be configured to produce monochrome images. The image forming apparatus 100 may even be an electrophotographic printer or a multifunction peripheral (MFP). The MFP is an apparatus that has at least two of a printing function, a copying function, a scanner function, and a facsimile function.

Figure 2:
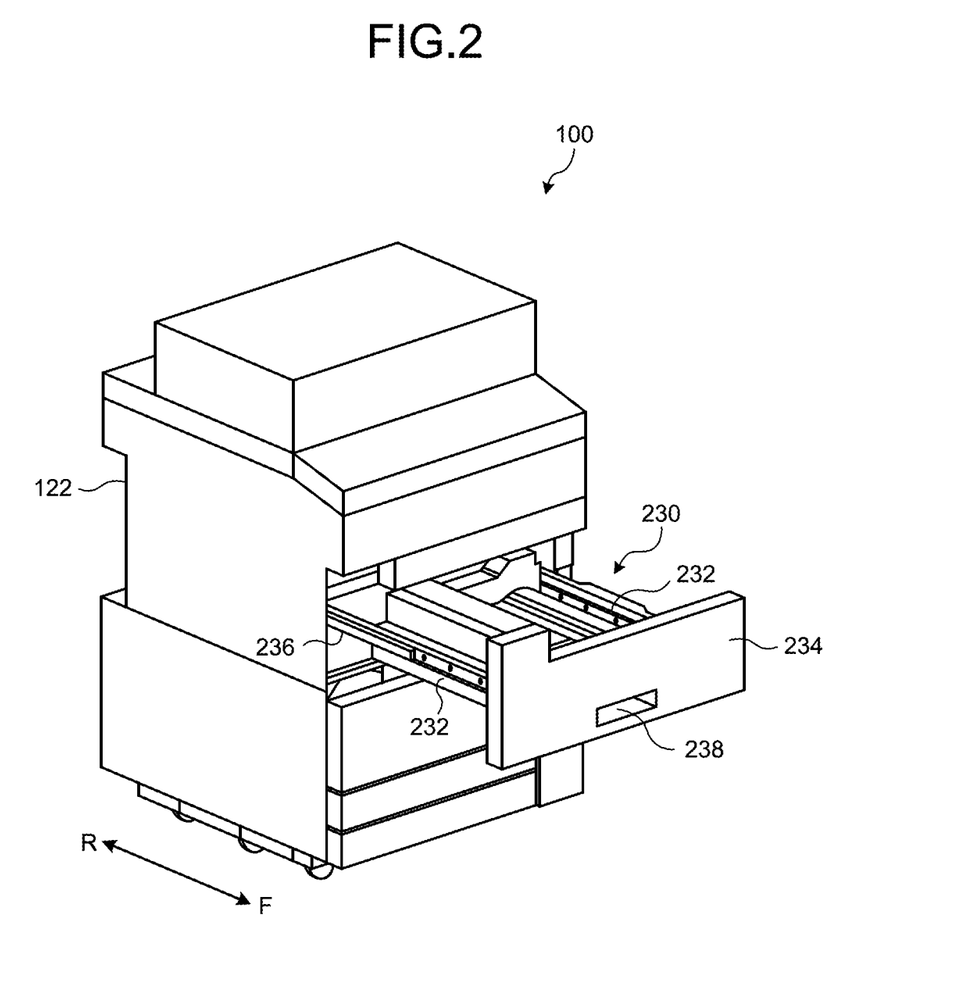
FIG. 2 is a perspective view illustrating the image forming apparatus under a condition in which a drawer unit is slid out from an apparatus main unit.

FIG. 2 is a perspective view illustrating the image forming apparatus 100 under a condition in which a drawer unit 230 is slid out from the apparatus main unit 122. The image forming apparatus 100 includes the drawer unit 230. The drawer unit 230 holds, for example, the main conveyance path 174, the secondary transfer unit 176, the intermediate conveyance path 178, the fixing unit 180, the paper ejection path 182, and the reversal conveyance path 184.

The drawer unit 230 includes a carrier 232 and a front cover 234. The apparatus main unit 122 includes rails 236. The carrier 232 holds, for example, the main conveyance path 174, the secondary transfer unit 176, the intermediate conveyance path 178, the fixing unit 180, the paper ejection path 182, and the reversal conveyance path 184. The carrier 232 is movably supported by the rails 236. The rails 236 support the drawer unit 230 slidably with respect to the apparatus main unit 122. The drawer unit 230 moves in the direction of R and F in FIG. 2. The drawer unit 230 is stowed in the apparatus main unit 122 when moved in the R direction. The drawer unit 230 is slid out of the apparatus main unit 122 when moved in the F direction.

The front cover 234 functions as a side wall of the apparatus main unit 122 under a condition in which the drawer unit 230 is stowed in the apparatus main unit 122. The front cover 234 has a handle 238 formed therein. The user grips the handle 238 and exerts force in a withdrawing direction to thereby be able to slide the drawer unit 230 out of the apparatus main unit 122.

The drawer unit 230, when slid out of the apparatus main unit 122, can expose, for example, the main conveyance path 174, the secondary transfer unit 176, the intermediate conveyance path 178, the fixing unit 180, the paper ejection path 182, and the reversal conveyance path 184 that are disposed thereinside.

The foregoing arrangement allows the user to perform maintenance of, for example, the main conveyance path 174, the secondary transfer unit 176, the intermediate conveyance path 178, the fixing unit 180, the paper ejection path 182, and the reversal conveyance path 184. When, for example, a paper jam occurs at any spot of the main conveyance path 174, the secondary transfer unit 176, the intermediate conveyance path 178, the fixing unit 180, the paper ejection path 182, or the reversal conveyance path 184, the user can remove the stuck paper.

Additionally, the drawer unit 230 receives electricity supplied from the apparatus main unit 122 and supplies, for example, the main conveyance path 174, the secondary transfer unit 176, the intermediate conveyance path 178, the fixing unit 180, the paper ejection path 182, and the reversal conveyance path 184 with the electricity. For example, the drawer unit 230 supplies a motor for conveying paper with the electricity supplied from the apparatus main unit 122. A power wire for supplying electricity from the apparatus main unit 122 to the motor is connected by a connector between the apparatus main unit 122 and the drawer unit 230. This connector is connected when the drawer unit 230 is stowed in the apparatus main unit 122 and disconnected when the drawer unit 230 is slid out of the apparatus main unit 122. Thus, the motors, for example, provided in the drawer unit 230 receive the supply of electricity when the drawer unit 230 is stowed in the apparatus main unit 122. The supply of electricity to the motors, for example, is suspended when the drawer unit 230 is slid out of the apparatus main unit 122.

Figure 3:
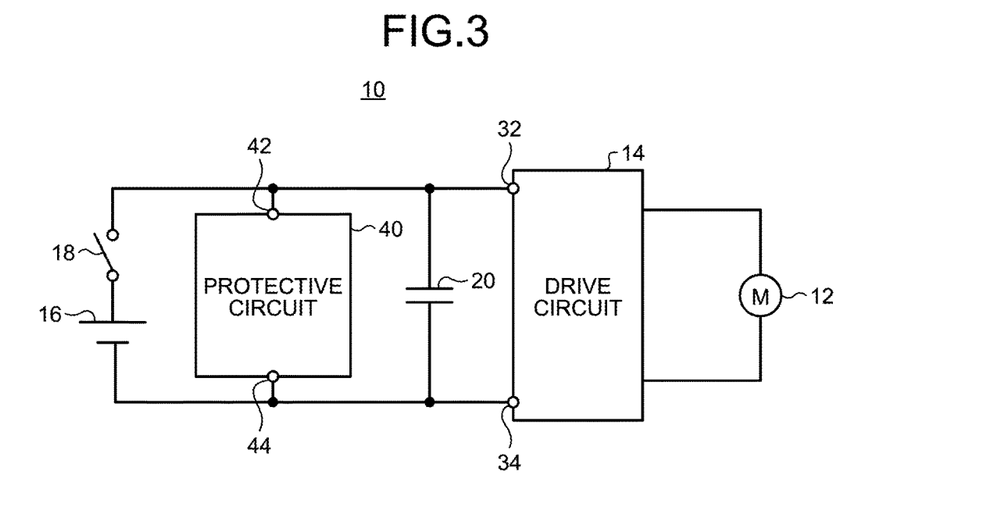
FIG. 3 is a diagram illustrating a configuration of a motor drive system according to the embodiment.

FIG. 3 is a diagram illustrating a configuration of a motor drive system 10 according to the embodiment. The motor drive system 10 is mounted on, for example, the image forming apparatus 100 illustrated in FIGS. 1 and 2. The motor drive system 10 may be applied, for example, to a paper conveyance motor system in the image forming apparatus 100. The motor drive system 10 includes a motor 12, a drive circuit 14, a DC power source 16, a switch 18, a decoupling capacitor 20, and a protective circuit 40 (protective device).

The motor 12 is a DC motor. The drive circuit 14 drives the motor 12. The DC power source 16 generates power source voltage for driving the motor 12. The switch 18 switches between a first state in which the power source voltage generated by the DC power source 16 is applied to the drive circuit 14 and a second state in which the power source voltage generated by the DC power source 16 is not applied to the drive circuit 14.

The drive circuit 14 has a positive power source end 32 and a negative power source end 34. A positive-side power source voltage is applied from the DC power source 16 to the positive power source end 32. A negative-side power source voltage is applied from the DC power source 16 to the negative power source end 34. The positive-side power source voltage is, for example, a voltage of +30 V. The negative-side power source voltage is, for example, ground potential.

The decoupling capacitor 20 is a capacitor disposed between the positive power source end 32 and the negative power source end 34. The decoupling capacitor 20 suppresses power source noise, for example, generated by the DC power source 16.

The protective circuit 40 is an electronic circuit that passes a current to consume electricity when a voltage exceeding a first voltage is applied across a positive voltage end 42 and a negative voltage end 44. While a voltage equal to or lower than the first voltage is being applied across the positive voltage end 42 and the negative voltage end 44, the protective circuit 40 does not pass a current and thus does not consume electricity. A voltage that is positive relative to a voltage applied to the negative voltage end 44 is applied to the positive voltage end 42.

In the present embodiment, the protective circuit 40 protects the drive circuit 14 as a device to be protected against overvoltages. The protective circuit 40 has the positive voltage end 42 connected with the positive power source end 32 of the drive circuit 14 and the negative voltage end 44 connected with the negative power source end 34 of the drive circuit 14. The drive circuit 14 generates a voltage equal to or lower than the first voltage under a normal operating condition and generates a voltage exceeding the first voltage under an abnormal operating condition. When the voltage exceeding the first voltage is generated across the positive power source end 32 and the negative power source end 34 of the drive circuit 14, the protective circuit 40 passes a current to thereby consume electricity. This arrangement enables the protective circuit 40 to protect the drive circuit 14 against overvoltages.

The motor drive system 10 as described above is applied to, for example, paper feeding for the image forming apparatus 100 such as a multifunction peripheral. When the motor drive system 10 is applied to the paper feeding, the motor 12 runs idly to generate an electromotive force when, for example, power is turned off. When the drive circuit 14 generates a voltage exceeding the first voltage through the idle run of the motor 12, the protective circuit 40 passes a current output from the drive circuit 14 to thereby consume electricity. This action enables the protective circuit 40 to protect the drive circuit 14 against overvoltages arising from, for example, the idle run of the motor 12.

When, for example, power is turned on, noise may be generated in a power line (across the positive power source end 32 and the negative power source end 34). When the drive circuit 14 generates a voltage exceeding the first voltage due to the noise in the power line, the protective circuit 40 passes a current output from the drive circuit 14 to thereby consume electricity. Because of this action, the protective circuit 40 can protect the drive circuit 14 against an overvoltage arising from, for example, noise in the power line.

Figure 4:
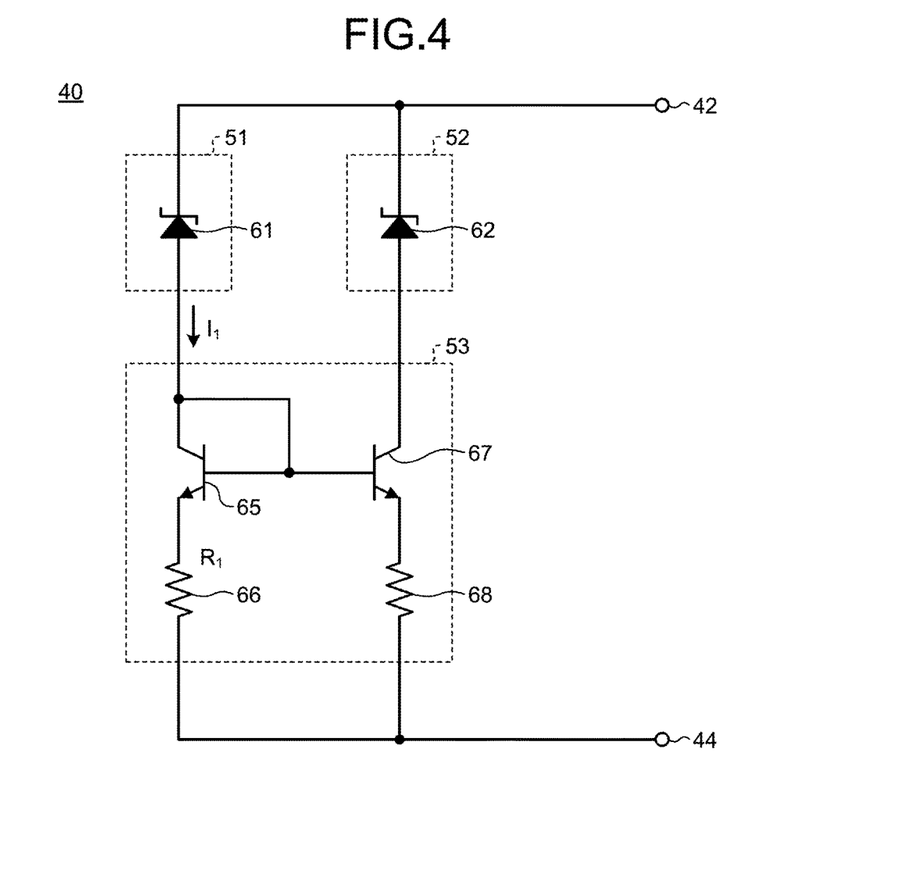
FIG. 4 is a diagram illustrating a configuration of a protective circuit.

FIG. 4 is a diagram illustrating a configuration of the protective circuit 40. The protective circuit 40 includes a first consumption part 51, a second consumption part 52, and a current mirror circuit 53.

The first consumption part 51 passes a current to thereby consume electricity when a voltage exceeding the first voltage is applied across the positive voltage end 42 and the negative voltage end 44. In the present embodiment, when the drive circuit 14 generates a voltage exceeding the first voltage, the first consumption part 51 passes the current output from the drive circuit 14 to thereby consume electricity.

For example, the first consumption part 51 includes a first Zener diode 61. A reverse-bias voltage is applied to the first Zener diode 61. Specifically, the first Zener diode 61 is disposed such that a cathode is on the positive voltage end 42 side and an anode is on the negative voltage end 44 side. The first Zener diode 61 breaks down when the voltage applied across the positive voltage end 42 and the negative voltage end 44 exceeds the first voltage. This arrangement enables the first Zener diode 61 to pass a current to thereby consume electricity when a voltage exceeding the first voltage is applied across the positive voltage end 42 and the negative voltage end 44.

The second consumption part 52 is disposed in parallel with the first consumption part 51 between the positive voltage end 42 and the negative voltage end 44. The second consumption part 52 passes a current to thereby consume electricity. In the present embodiment, the second consumption part 52 passes a current output from the drive circuit 14 to thereby consume electricity.

For example, the second consumption part 52 includes a second Zener diode 62. A reverse-bias voltage is applied to the second Zener diode 62. Specifically, the second Zener diode 62 is disposed such that a cathode is on the positive voltage end 42 side and an anode is on the negative voltage end 44 side. The second Zener diode 62 breaks down when the voltage applied across the positive voltage end 42 and the negative voltage end 44 exceeds a second voltage that is equal to or lower than the first voltage. This arrangement enables the second Zener diode 62 to pass a current to thereby consume electricity when a voltage exceeding the second voltage is applied across the positive voltage end 42 and the negative voltage end 44.

It should be noted that the second Zener diode 62 breaks down but does not pass a current, unless the current mirror circuit 53 passes a current. Specifically, the second Zener diode 62 does not pass a current even when a voltage exceeding the second voltage is applied across the positive voltage end 42 and the negative voltage end 44, unless the current mirror circuit 53 passes a current. To sum up, the second Zener diode 62 breaks down when a voltage exceeding the second voltage is applied and the second Zener diode 62 passes a current under a condition in which a current flows through the current mirror circuit 53.

The current mirror circuit 53 passes, to the second consumption part 52, a current corresponding to a current that flows through the first consumption part 51. The first consumption part 51 passes a current when a voltage exceeding the first voltage is applied, specifically, for example, when the drive circuit 14 generates a voltage exceeding the first voltage. Thus, the current mirror circuit 53 passes a current to the second consumption part 52 when a voltage exceeding the first voltage is applied across the positive voltage end 42 and the negative voltage end 44, for example, when the drive circuit 14 generates a voltage exceeding the first voltage.

The current mirror circuit 53, for example, includes a bipolar transistor. In the present embodiment, the current mirror circuit 53 includes a reference transistor 65, a reference-side emitter resistor 66, an output transistor 67, and an output-side emitter resistor 68.

The reference transistor 65 is an NPN bipolar transistor. The reference transistor 65 has a collector and a base connected with the anode of the first Zener diode 61. The first Zener diode 61 has the cathode connected with the positive voltage end 42.

The reference-side emitter resistor 66 has a first end connected with an emitter of the reference transistor 65. The reference-side emitter resistor 66 has a second end connected with the negative voltage end 44.

The output transistor 67 is an NPN bipolar transistor. The output transistor 67 has a collector connected with the anode of the second Zener diode 62 and a base connected with the base of the reference transistor 65. The second Zener diode 62 has the cathode connected with the positive voltage end 42.

The output-side emitter resistor 68 has a first end connected with an emitter of the output transistor 67. The output-side emitter resistor 68 has a second end connected with the negative voltage end 44.

When a voltage exceeding the first voltage is applied across the positive voltage end 42 and the negative voltage end 44, the first Zener diode 61 breaks down to thereby pass a current. When the current flows through the first Zener diode 61, the current mirror circuit 53 passes a current across the collector and the emitter of the reference transistor 65. When the current flows across the collector and the emitter of the reference transistor 65, the current mirror circuit 53 passes, across the collector and the emitter of the output transistor 67, a current (e.g., an identical current or a current multiplied by a predetermined value) corresponding to an amount of the current flowing across the collector and the emitter of the reference transistor 65.

It is here noted that the second Zener diode 62 breaks down with a voltage exceeding the second voltage. The second voltage is equal to or lower than the first voltage. The first Zener diode 61 breaks down when a voltage exceeding the first voltage is applied across the positive voltage end 42 and the negative voltage end 44. That is, the second Zener diode 62 has already broken down to allow a current to flow when a voltage that breaks down the first Zener diode 61 is applied. Thus, the current mirror circuit 53 can pass a current across the collector and the emitter of the output transistor 67 simultaneously when a current flows across the collector and the emitter of the reference transistor 65.

The foregoing arrangements enable the protective circuit 40 to cause a current to flow simultaneously through the first consumption part 51 and the second consumption part 52 to thereby consume electricity when a voltage exceeding the first voltage is applied across the positive voltage end 42 and the negative voltage end 44. When, for example, the drive circuit 14 generates a voltage exceeding the first voltage, the protective circuit 40 can cause a current output from the drive circuit 14 to flow simultaneously through the first consumption part 51 and the second consumption part 52, to thereby allow electricity to be consumed. The foregoing enables the protective circuit 40 to eliminate, with a simple configuration, a condition in which a current flows through a first current consumption part (e.g., Zener diode), but not through a second current consumption part (e.g., Zener diode). Thus, the protective circuit 40 enables consumption of electricity by passing a large current with a simple configuration.

It should be noted that a Zener diode consumes a large amount of electricity per unit volume. Thus, the first Zener diode 61 and the second Zener diode 62 consume a large amount of electricity with a relatively small size.

In the reference transistor 65 and the output transistor 67, preferably, voltages across the bases and the emitters are substantially identical to each other. This arrangement eliminates a condition in which one of the reference transistor 65 and the output transistor 67 is on, while the other is off.

Let, for example, Verr be a maximum difference in terms of specifications between the voltage across the base and the emitter of the reference transistor 65 and the voltage across the base and the emitter of the output transistor 67. Where $I_1$ is a current that flows through the first Zener diode 61 and $R_1$ is a resistance value of the reference-side emitter resistor 66, the resistance value $R_1$ may then be set such that expression (1) given below is satisfied.

$$Verr < I_1 \times R_1 \quad (1)$$

The foregoing arrangement allows the current mirror circuit 53 to provide negative feedback by the reference-side emitter resistor 66 across the base and the emitter, so that variations in the voltage across the base and the emitter can be absorbed and a condition can be eliminated in which one of the reference transistor 65 and the output transistor 67 is on, while the other is off.

The current mirror circuit 53 may include, instead of a bipolar transistor, a field-effect transistor (FET). The configuration including the FET allows the current mirror circuit 53 to pass a large current through the first consumption part 51 and the second consumption part 52 as compared with the configuration including a bipolar transistor.

Alternatively, the current mirror circuit 53 may include an operational amplifier (OP amp) or any other device. Additionally, the device to be protected by the protective circuit 40 against overvoltages may be any device other than the drive circuit 14 of the motor 12.

Figure 5:
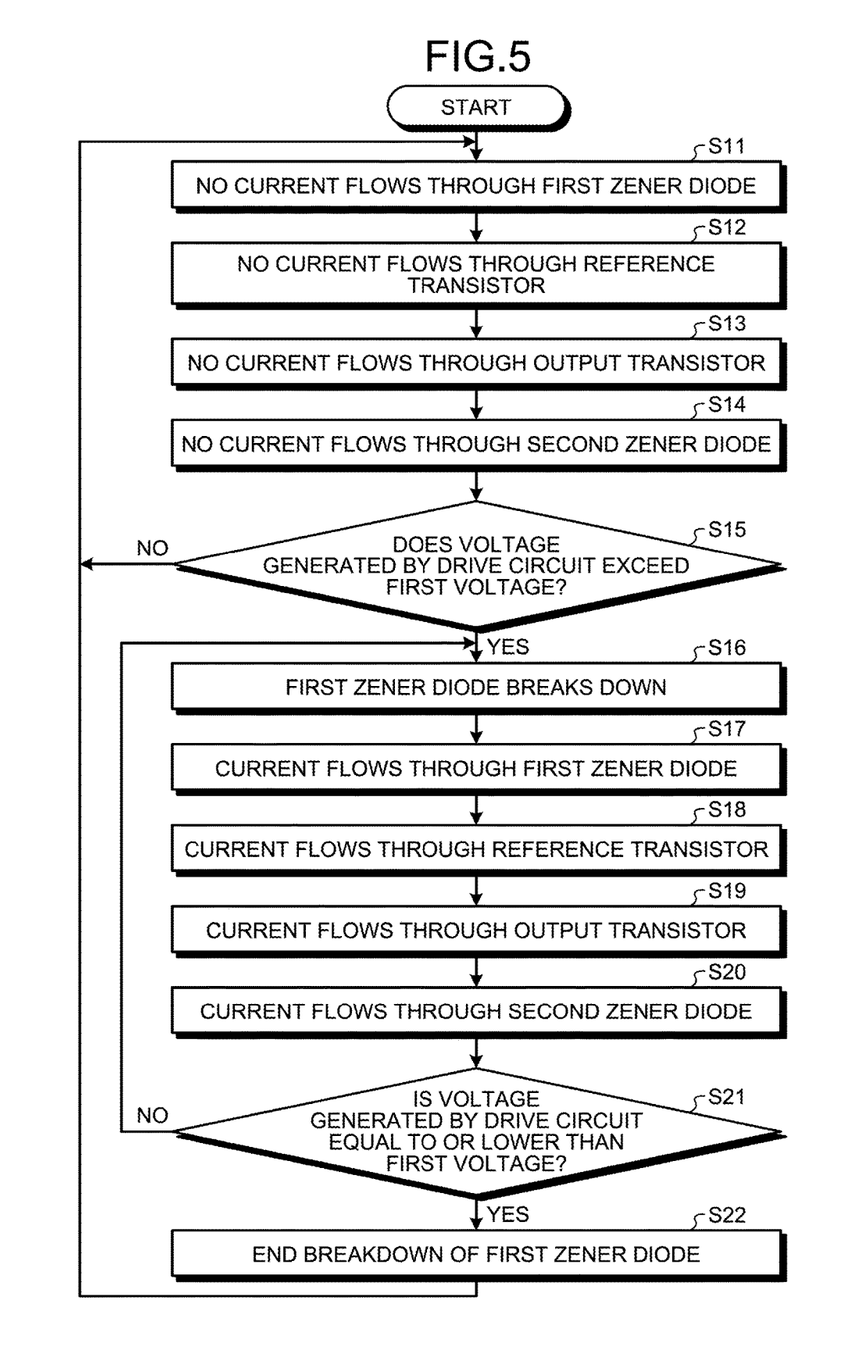
FIG. 5 is a state transition diagram schematically illustrating transition of states of the protective circuit.

FIG. 5 is a state transition diagram schematically illustrating transition of states of the protective circuit 40. The protective circuit 40 undergoes transition as illustrated in FIG. 5 to thereby protect the drive circuit 14 against overvoltages. The drive circuit 14 is in a normal condition and generates a voltage equal to or lower than the first voltage.

In this case, the first Zener diode 61 is yet to break down. Thus, no current flows through the first Zener diode 61 (S11). Because no current flows through the first Zener diode 61, no current flows through the reference transistor 65 (S12). Because no current flows through the reference transistor 65, no current flows through the output transistor 67 (S13). Because no current flows through the output transistor 67, no current flows through the second Zener diode 62 (S14).

Thus, when the drive circuit 14 generates a voltage equal to or lower than the first voltage, the protective circuit 40 does not pass a current output from the drive circuit 14 and does not consume electricity. The protective circuit 40 maintains the states from S11 to S14 until the drive circuit 14 generates a voltage exceeding the first voltage (No at S15).

The drive circuit 14 runs into an abnormal state as a result of noise being generated or the motor 12 running idly and the drive circuit 14 generates an overvoltage exceeding the first voltage (Yes at S15).

In this case, the first Zener diode 61 breaks down (S16). Meanwhile, the second Zener diode 62 has a breakdown voltage lower than a breakdown voltage of the first Zener diode 61. Thus, the second Zener diode 62 has already broken down when the first Zener diode 61 breaks down.

The breakdown of the first Zener diode 61 results in a current flowing through the first Zener diode 61 (S17). When the current flows through the first Zener diode 61, a current flows across the base and the emitter of the reference transistor 65, so that the reference transistor 65 turns on (S18). Additionally, a current flows across the base and the emitter of the output transistor 67, so that the output transistor 67 turns on (S19). Because the output transistor 67 turns on under a condition in which a voltage higher than the breakdown voltage of the second Zener diode 62 is applied to the second Zener diode 62, a current flows through the second Zener diode 62 (S20).

Thus, the protective circuit 40 can consume electricity by passing the current output from the drive circuit 14 as long as the drive circuit 14 generates a voltage exceeding the first voltage. In this case, the protective circuit 40 uses the two Zener diodes to pass the current in parallel and is thus able to consume large electricity.

The protective circuit 40 maintains the states from S16 to S20 until the drive circuit 14 generates a voltage equal to or lower than the first voltage (No at S21). When the drive circuit 14 generates a voltage equal to or lower than the first voltage (Yes at S21), the breakdown of the first Zener diode 61 ends (S22) and the state in which no current flows through the first Zener diode 61 is resumed (S11).

Figure 6:
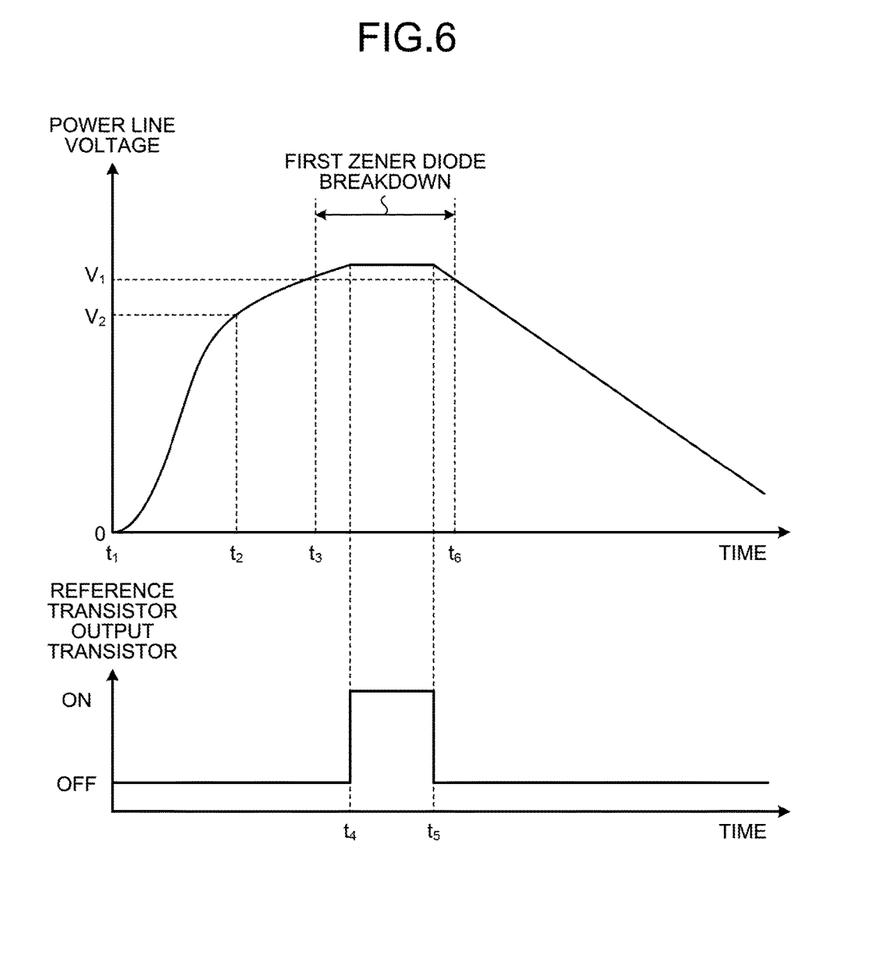
FIG. 6 is a graph illustrating changes in voltage and switching states of transistors when a power source voltage is not applied to a drive circuit.

FIG. 6 is a graph illustrating changes in voltage and switching states of the transistors when the motor runs idly and the power source voltage is not applied to the drive circuit 14. When a power source voltage $V_{DD}$ generated by the DC power source 16 is not applied to the drive circuit 14, the decoupling capacitor 20 does not store an electric charge.

Thus, as indicated at time $t_1$ in FIG. 6, the voltage of the power line (voltage across the positive power source end 32 and the negative power source end 34) is 0 (zero).

When the motor 12 starts running idly at time $t_1$, an electromotive force is generated from the drive circuit 14 and an electric charge is stored in the decoupling capacitor 20. As a result, the voltage of the power line (voltage of the decoupling capacitor 20) increases after time $t_1$.

The voltage of the power line continues increasing and, at time $t_2$, exceeds a second voltage $V_2$. When the voltage of the power line exceeds the second voltage $V_2$, the second Zener diode 62 breaks down. The current mirror circuit 53, however, remains off until a first voltage $V_1$ is exceeded even though the second voltage $V_2$ is exceeded. No current thus flows through the second Zener diode 62. Thus, the voltage of the power line continues increasing even after time $t_2$.

The voltage of the power line continues increasing and, at time $t_3$, exceeds the first voltage $V_1$. When the voltage of the power line exceeds the first voltage $V_1$, the first Zener diode 61 breaks down. The breakdown of the first Zener diode 61 results in a current flowing through the first Zener diode 61. The flow of the current through the first Zener diode 61 causes a voltage to be applied to the bases of the reference transistor 65 and the output transistor 67. When, at time $t_4$, the voltage across the base and the emitter exceeds an on-state voltage to thereby cause a current to flow across the base and the emitter, the current mirror circuit 53 (the reference transistor 65 and the output transistor 67) turns on. When the current mirror circuit 53 turns on, a current flows also through the second Zener diode 62. Thus, after time $t_4$, the reference-side emitter resistor 66 and the output-side emitter resistor 68 serve as loads to consume electricity, so that the voltage of the power line does not increase. It should be noted that the period of time from time $t_3$ at which the first Zener diode 61 breaks down to time $t_4$ at which the voltage of the power line stops increasing is, although extremely short in practice, schematically illustrated to extend over a given time width in FIG. 6.

When the motor 12 stops running idly at time $t_5$, the decoupling capacitor 20 starts self-discharge. The start of the self-discharge causes the current to decrease across the bases and the emitters of the reference transistor 65 and the output transistor 67, so that the current mirror circuit 53 turns off. The self-discharge continues thereafter and, when the voltage of the power line is equal to or lower than the first voltage $V_1$ at time $t_6$, the breakdown state of the first Zener diode 61 ends and the first Zener diode 61 and the second Zener diode 62 no longer pass a current. Thus, after time $t_6$, the voltage of the power line gradually decreases to approach 0 (zero) as the decoupling capacitor 20 performs self-discharge.

Figure 7:
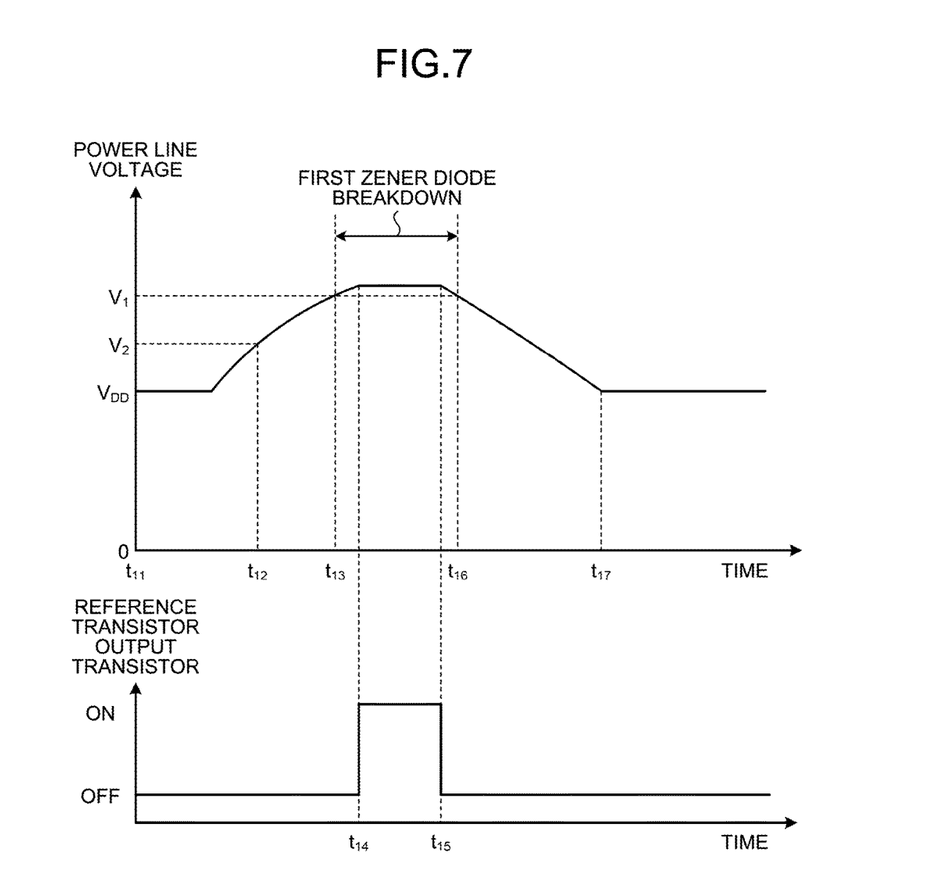
FIG. 7 is a graph illustrating changes in voltage and switching states of the transistors when the power source voltage is applied to the drive circuit.

FIG. 7 is a graph illustrating changes in voltage and switching states of the transistors when noise is generated and the power source voltage is applied to the drive circuit 14. When the power source voltage $V_{DD}$ generated by the DC power source 16 is applied, the decoupling capacitor 20 stores an electric charge. Thus, as indicated at time $t_{11}$ in FIG. 7, the voltage of the power line (voltage across the positive power source end 32 and the negative power source end 34) is $V_{DD}$.

When noise is generated at time $t_{11}$, an electric charge is stored in the decoupling capacitor 20. As a result, the voltage of the power line (voltage of the decoupling capacitor 20) increases after time $t_{11}$.

The voltage of the power line continues increasing and, at time $t_{12}$, exceeds the second voltage $V_2$ and the second Zener diode 62 breaks down. No current, however, flows through the second Zener diode 62 and the voltage of the power line continues increasing even after time $t_{12}$.

The voltage of the power line continues increasing and, at time $t_{13}$, exceeds the first voltage $V_1$. When the voltage of the power line exceeds the first voltage $V_1$, the first Zener diode 61 breaks down. The breakdown of the first Zener diode 61 results in a current flowing through the first Zener diode 61. The flow of the current through the first Zener diode 61 causes a voltage to be applied to the bases of the reference transistor 65 and the output transistor 67. When, at time $t_{14}$, the voltage across the base and the emitter exceeds an on-state voltage to thereby cause a current to flow across the base and the emitter, the current mirror circuit 53 (the reference transistor 65 and the output transistor 67) turns on. When the current mirror circuit 53 turns on, a current flows also through the second Zener diode 62. Thus, after time $t_{14}$, the reference-side emitter resistor 66 and the output-side emitter resistor 68 serve as loads to consume electricity, so that the voltage of the power line does not increase. It should be noted that the period of time from time $t_{13}$ at which the first Zener diode 61 breaks down to time $t_{14}$ at which the voltage of the power line stops increasing is, although extremely short in practice, schematically illustrated to extend over a given time width in FIG. 7.

When the noise stops at time $t_{15}$, the decoupling capacitor 20 starts self-discharge. The start of the self-discharge causes the current to decrease across the bases and the emitters of the reference transistor 65 and the output transistor 67, so that the current mirror circuit 53 turns off. The self-discharge continues thereafter and, when the voltage of the power line is equal to or lower than the first voltage $V_1$ at time $t_{16}$, the breakdown state of the first Zener diode 61 ends and the first Zener diode 61 and the second Zener diode 62 no longer pass a current. Thus, after time $t_{16}$, the voltage of the power line gradually decreases as the decoupling capacitor 20 performs self-discharge. Then, at time $t_{17}$, the voltage of the power line reaches $V_{DD}$ to thereafter stop decreasing.

As described above, the protective circuit 40 can pass the current output from the drive circuit 14 simultaneously through both the first Zener diode 61 and the second Zener diode 62 disposed in parallel with each other even when the voltage of the power line exceeds the first voltage. Thus, the protective circuit 40 enables consumption of electricity by passing a large current with a simple configuration.

Figure 8:
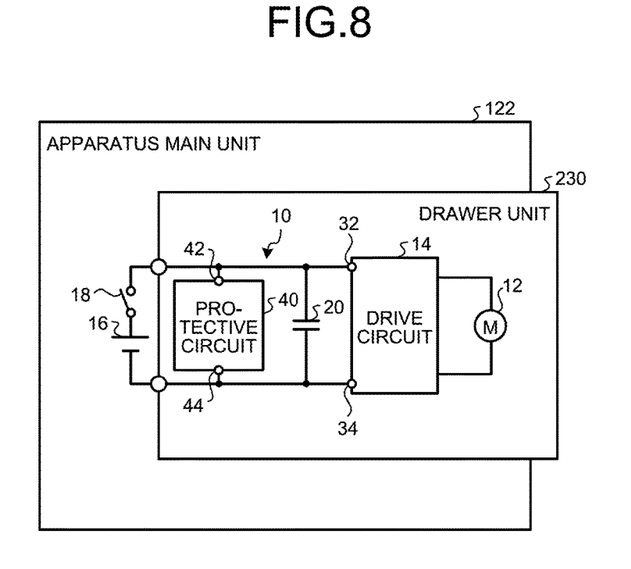
FIG. 8 is a diagram illustrating an exemplary configuration of a motor drive system mounted in the image forming apparatus.

FIG. 8 is a diagram illustrating an exemplary configuration of the motor drive system 10 mounted in the image forming apparatus 100. In an exemplary configuration in which the motor drive system 10 is mounted for conveyance of paper through the image forming apparatus 100, the DC power source 16 and the switch 18 are exemplarily mounted in the apparatus main unit 122. Additionally, in this case, the motor 12, the drive circuit 14, the decoupling capacitor 20, and the protective circuit 40 are mounted in the drawer unit 230.

Figure 9:
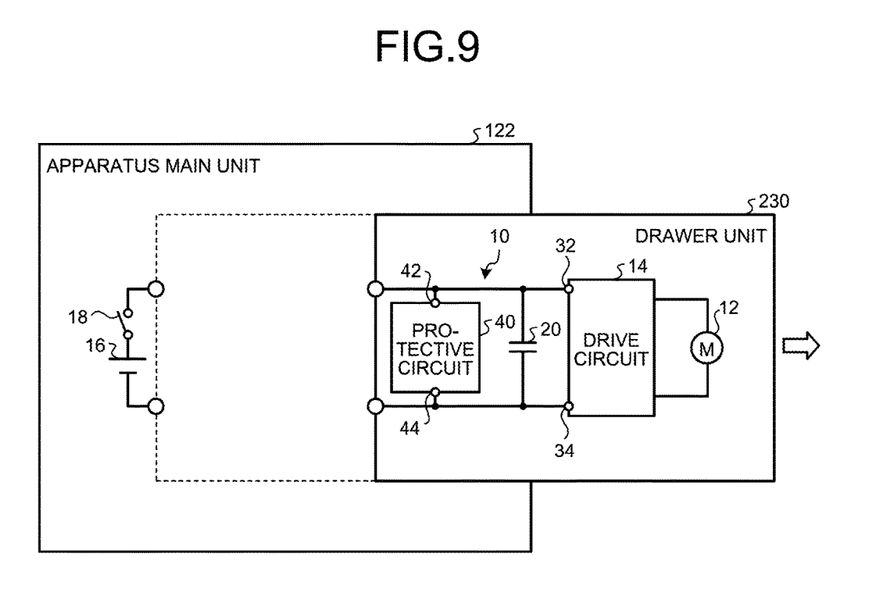
FIG. 9 is a diagram illustrating an exemplary configuration of the motor drive system under a condition in which a drawer unit is slid out of an apparatus main unit.

FIG. 9 is a diagram illustrating an exemplary configuration of the motor drive system 10 under a condition in which the drawer unit 230 is slid out of the apparatus main unit 122. When the drawer unit 230 is slid out of the apparatus main unit 122, the connector is disconnected. As a result, the power wire for supplying the drive circuit 14 with electricity from the apparatus main unit 122 is interrupted between the apparatus main unit 122 and the drawer unit 230, so that the supply of electricity to the drive circuit 14 is suspended.

When the user removes paper stuck in the conveyance path with the drawer unit 230 slid out of the apparatus main unit 122, the motor 12 for paper conveyance may runs idly as the paper is removed. When the motor 12 runs idly with no electricity supplied thereto, an electromotive force is generated and an abnormal voltage is applied to the drive circuit 14.

Should a voltage exceeding the first voltage be generated across the positive power source end 32 and the negative power source end 34 of the drive circuit 14, however, the protective circuit 40 can pass a current to thereby consume electricity. Thus, the image forming apparatus 100 can protect the drive circuit 14 even when the motor 12 runs idly under the condition in which the drawer unit 230 is slid out of the apparatus main unit 122.

Figure 10:
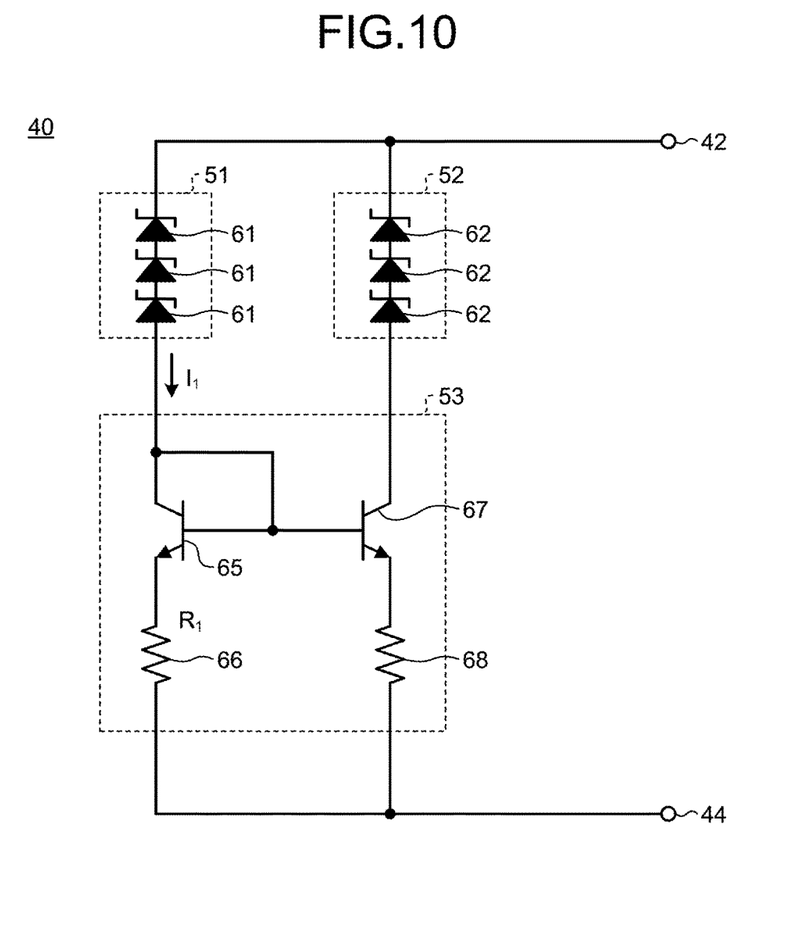
FIG. 10 is a diagram illustrating a configuration of a protective circuit according to a first modification.

FIG. 10 is a diagram illustrating a configuration of a protective circuit 40 according to a first modification. A first consumption part 51 according to the first modification includes a plurality of first Zener diodes 61 connected in series with each other. This arrangement enables the protective circuit 40 to readily adjust the first voltage. Additionally, the protective circuit 40 can make a general allowable dissipation of the first consumption part 51 large.

A second consumption part 52 according to the first modification also includes a plurality of second Zener diodes 62 connected in series with each other. This arrangement enables the protective circuit 40 to have a large allowable dissipation of the second consumption part 52 as a whole. It should be noted that the second consumption part 52 may include the second Zener diodes 62 that are different in number from the first Zener diodes 61 of the first consumption part 51. The second consumption part 52 in the first modification can reliably set the second voltage that is equal to or lower than the first voltage.

Figure 11:
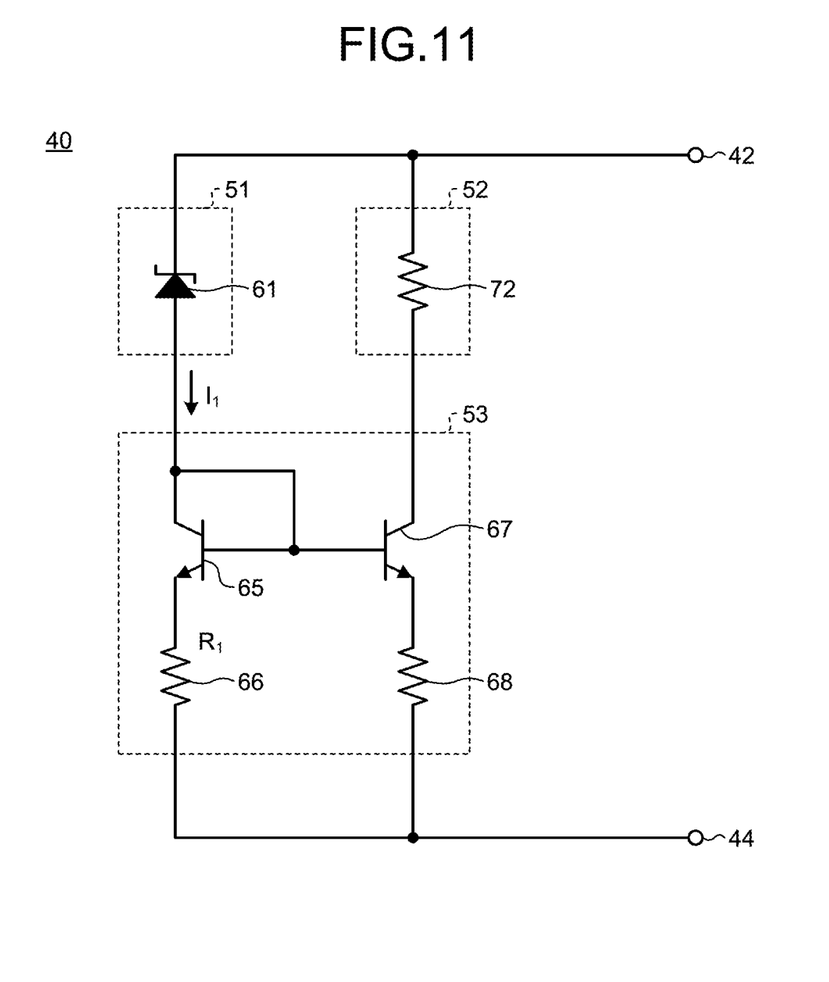
FIG. 11 is a diagram illustrating a configuration of a protective circuit according to a second modification.

FIG. 11 is a diagram illustrating a configuration of a protective circuit 40 according to a second modification. A second consumption part 52 according to the second modification may include, instead of the second Zener diode 62, a resistor 72. Exemplarily, the resistor 72 has a first end connected with the positive voltage end 42 and a second end connected with the collector of the output transistor 67. In this case, the resistor 72 has a rating that permits a current to flow also when the first voltage is applied. The protective circuit 40 having the arrangements as described above can convert a flowing current to heat with the resistor 72, so that the protective circuit 40 can pass the current output from the drive circuit 14 to thereby consume electricity.

Figure 12:
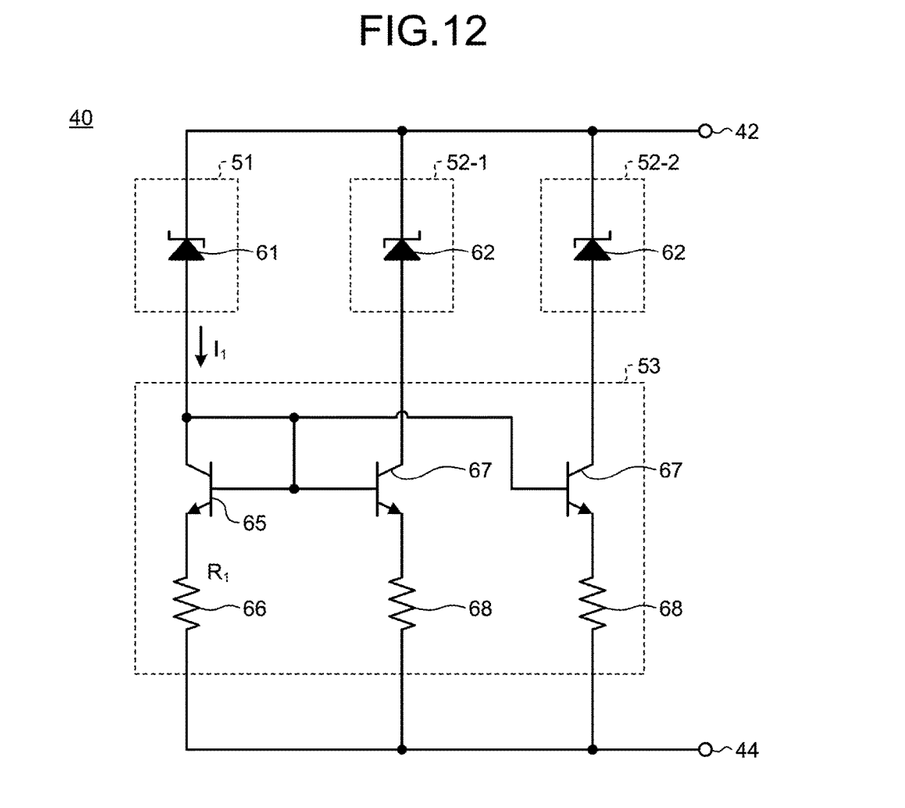
FIG. 12 is a diagram illustrating a configuration of a protective circuit according to a third modification.

FIG. 12 is a diagram illustrating a configuration of a protective circuit 40 according to a third modification. The protective circuit 40 according to the third modification includes a plurality of second consumption parts 52. For example, in the example illustrated in FIG. 12, the protective circuit 40 includes a second consumption part 52-1 and a second consumption part 52-2.

In this case, a current mirror circuit 53 passes a current corresponding to a current that flows through a first consumption part 51 to each of the second consumption parts 52-1 and 52-2. The current mirror circuit 53 passes the current to each of the second consumption parts 52-1 and 52-2 simultaneously when the current flows through the first consumption part 51.

For example, the current mirror circuit 53 includes a plurality of output transistors 67 and a plurality of output-side emitter resistors 68 that are associated with the respective second consumption parts 52. The output transistors 67 each have a collector connected with an anode of a second Zener diode 62 included in the corresponding second consumption part 52.

The output-side emitter resistors 68 each have a first end connected with an emitter of a corresponding output transistor 67. The output-side emitter resistors 68 each have a second end connected with a negative voltage end 44.

The protective circuit 40 according to the third modification described above can increase an amount of the current output from a drive circuit 14. Thus, when the drive circuit 14 generates a voltage exceeding the first voltage, the protective circuit 40 according to the third modification can quickly decrease the voltage.

The present invention enables consumption of electricity by passing a current with a simple configuration.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An electronic circuit, comprising:
a first consumption part configured to pass a current to consume electricity in response to a voltage exceeding a first voltage being applied, wherein the first consumption part includes a first Zener diode disposed such that a cathode is on a side of a positive voltage end and an anode is on a side of a negative voltage end, and the first Zener diode is configured to receive a reverse-bias voltage applied thereto and break down in response to the applied voltage exceeding the first voltage;
at least one second consumption part disposed in parallel with the first consumption part and configured to pass a current to consume electricity, wherein the at least one second consumption part includes a second Zener diode disposed such that a cathode is on the side of the positive voltage end and an anode is on the side of the negative voltage end, and the second Zener diode is configured to receive a reverse-bias voltage applied thereto and break down in response to the applied voltage exceeding a second voltage that is equal to or lower than the first voltage; and
a current mirror circuit configured to pass, to the second consumption part, a current corresponding to a current that flows through the first consumption part, wherein the current mirror circuit includes,
a reference transistor, wherein the reference transistor is an NPN type bipolar transistor having a collector and a base that are connected with the anode of the first Zener diode,
a reference-side emitter resistor, wherein the reference-side emitter resistor has a first end connected with an emitter of the reference transistor and a second end connected with the negative voltage end,
a output transistor, wherein the output transistor is an NPN type bipolar transistor having a collector connected with the anode of the second Zener diode and a base connected with the base of the reference transistor, and
an output-side emitter resistor, wherein the output-side emitter resistor has a first end connected with an emitter of the output transistor and a second end connected with the negative voltage end.

2. The electronic circuit according to claim 1, wherein the at least one second consumption part comprises a plurality of second consumption parts.

3. The electronic circuit according to claim 1, wherein expression (1) given below is satisfied:

$$Verr < I_1 \times R_1 \quad (1)$$

where Verr is a maximum difference in terms of specifications between a base-emitter voltage of the reference transistor and a base-emitter voltage of the output transistor, $I_1$ is a current that flows through the first Zener diode, and $R_1$ is a resistance value of the reference-side emitter resistor.

4. The electronic circuit according to claim 1, wherein the at least one second consumption part does not pass a current, even when the applied voltage exceeding the second voltage causes the second Zener diode to break down, unless the current mirror circuit passes a current to the at least one second consumption part in response to the applied voltage exceeding the first voltage causing the first Zener diode to break down and the first consumption part to pass a current to the current mirror circuit.

5. A protective device, comprising:
a device configured to generate a voltage exceeding a first voltage under an abnormal operating condition, wherein the device is a drive circuit configured to drive a motor; and
a protective circuit configured to protect the device, wherein the protective circuit includes:
a first consumption part configured to pass a current output from the device to consume electricity in response to a voltage exceeding the first voltage being generated from the device;
a second consumption part disposed in parallel with the first consumption part and configured to pass a current output from the device to consume electricity; and
a current mirror circuit configured to pass, to the second consumption part, a current corresponding to a current that flows through the first consumption part,
wherein the motor is applied to paper conveyance in an image forming apparatus and the drive circuit is configured to generate a voltage exceeding the first voltage while the image forming apparatus is in an off state.

6. The protective device according to claim 5, wherein:
the drive circuit is configured to generate a voltage exceeding the first voltage while the image forming apparatus is in the off state due to an idle run of the motor, and
the drive circuit is configured to generate a voltage exceeding the first voltage while the image forming apparatus is in an on state due to noise generated in a power line of the image forming apparatus.

7. The protective device according to claim 5, wherein the second consumption part does not pass a current, even when an applied voltage exceeding a second voltage that is equal to or lower than the first voltage causes a second Zener diode of the second consumption part to break down, unless the current mirror circuit passes a current to the second consumption part in response to an applied voltage exceeding the first voltage causing a first Zener diode of the first consumption part to break down and the first consumption part to pass a current to the current mirror circuit.

8. The protective device according to claim 5, wherein:
the first consumption part includes a plurality of first Zener diodes connected in series; and
the second consumption part includes a plurality of second Zener diodes connected in series.

9. An image forming apparatus that forms an image on a recording medium, the image forming apparatus comprising:
a device that generates a voltage exceeding a first voltage under an abnormal operating condition; and
a protective circuit that protects the device, wherein the protective circuit includes:
a first consumption part that passes a current output from the device to consume electricity when a voltage exceeding the first voltage is generated from the device;
a second consumption part that is disposed in parallel with the first consumption part and passes a current output from the device to consume electricity; and
a current mirror circuit that passes, to the second consumption part, a current corresponding to a current that flows through the first consumption part.

10. The image forming apparatus according to claim 9, further comprising:
an apparatus main unit; and
a drawer unit disposed to be withdrawn from the apparatus main unit,
wherein
the device is disposed in the drawer unit,
the device receives a supply of electricity from the apparatus main unit when the drawer unit is stowed in the apparatus main unit, and
the device generates a voltage exceeding the first voltage under an abnormal operating condition with the drawer unit withdrawn from the apparatus main unit.

11. The image forming apparatus according to claim 10, wherein the device is a motor that conveys the recording medium and generates a voltage exceeding the first voltage through an idle run with the drawer unit withdrawn from the apparatus main unit.

12. The image forming apparatus according to claim 9, wherein the device generates a voltage exceeding the first voltage due to noise generated in a power line of the image forming apparatus.

13. The image forming apparatus according to claim 9, wherein the second consumption part does not pass a current, even when an applied voltage exceeding a second voltage that is equal to or lower than the first voltage causes a second Zener diode of the second consumption part to break down, unless the current mirror circuit passes a current to the second consumption part in response to an applied voltage exceeding the first voltage causing a first Zener diode of the first consumption part to break down and the first consumption part to pass a current to the current mirror circuit.

14. The image forming apparatus according to claim 9, wherein:
the first consumption part includes a plurality of first Zener diodes connected in series; and
the second consumption part includes a plurality of second Zener diodes connected in series.

* * * * *